(No Model.)

G. H. CLINE.
BIFOCAL SPECTACLES.

No. 447,128. Patented Feb. 24, 1891.

WITNESSES:
Paul Johst
C. Sedgwick

INVENTOR:
G. H. Cline
BY
Munn & Co.
ATTORNEYS.

UNITED STATES PATENT OFFICE.

GODFREY HESS CLINE, OF JERSEY SHORE, PENNSYLVANIA.

BIFOCAL SPECTACLES.

SPECIFICATION forming part of Letters Patent No. 447,128, dated February 24, 1891.

Application filed September 17, 1889. Serial No. 324,210. (No model.)

*To all whom it may concern:*

Be it known that I, GODFREY HESS CLINE, of Jersey Shore, in the county of Lycoming and State of Pennsylvania, have invented new and useful Improvements in Bifocal Spectacles, of which the following is a specification, reference being had to the annexed drawings, forming a part thereof, in which—

Figure 1:
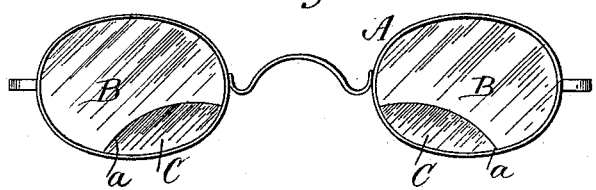
Figure 2:
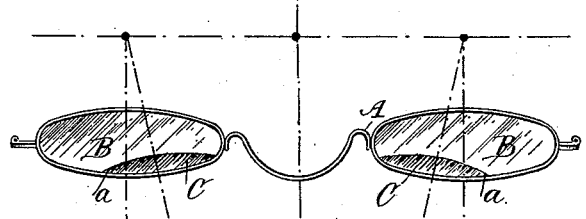
Figure 4:
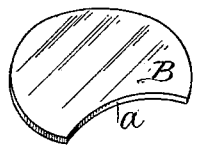
Figure 5:
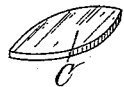
Figure 3:
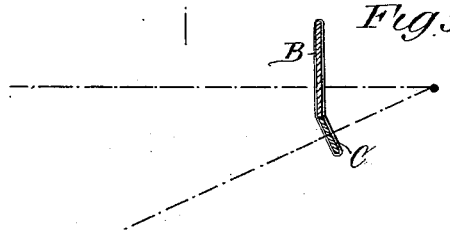

Figure 1 is a front elevation of a pair of spectacles constructed according to my improvement. Fig. 2 is a perspective view showing the prolongation of the axes of the lenses in broken lines. Fig. 3 is a transverse section taken through both members of the eyeglass. Fig. 4 is a detail perspective view of the long-focus or distance lenses, and Fig. 5 is a detail perspective view of the short-focus or near-vision lenses.

Similar letters of reference indicate corresponding parts in all the views.

The object of my invention is to provide a pair of bifocal glasses in which the distance-lenses, or lenses of long focus, will be of large area and admit of oblique vision without inconvenience, and in which the short-focus or near-vision lenses will be arranged with their axes convergent, the said near-vision lenses being placed in notches in the lower and inner or nasal edges of the long-focus lenses.

To the spectacle-frame A, of ordinary construction, are fitted the long-focus or distance lenses B, having their axes parallel, as shown in Fig. 2, so that the eye may view objects in any direction through the said lenses. In the lower and inner or nasal edges of the distance-lenses are formed curved notches $a$, and in the spaces between the notched edges of the lenses B and the spectacle-frame A are fitted the short-focus or near-view lenses C. The curved edges of the notches $a$ of distant-view lenses B are beveled to receive the upper edges of near-vision lenses C for the purpose of throwing the plane of said near-view lenses C at an angle with the plane of distant-view lenses B with their axes convergent, and the lower edges of lenses C are then ground to adapt them to groove in frame A. The axes of the said near-view lenses C converge at a common point located in the normal plane of near vision, so that the eyes when viewing near objects may see them without distortion or aberration. The parts of the bifocal lens are held in their places in the spectacle-frame in the usual way, and they require no connection with each other further than that furnished by the frame-pieces.

The advantage of my improvement over other devices intended for the same purpose is that the location of the near-vision lenses is such as to entirely avoid interference with the field of the long-distance lenses, and the near-vision lenses are arranged so that the line of vision coincides with the axis of the lenses. Consequently there is no distortion.

It is of course evident that the long-focus or distance lenses have their axes approximately parallel, and that the short-focus or near-view lenses, which are located within the notches of the long-focus or distance lenses at an angle to the plane of the long-focus lenses, have their axes convergent to a point in the plane of normal vision. The near-view lenses are placed with one horn of the lens at the lower temporal edge and the other horn at the middle nasal edge of the spectacles, so that a line drawn from one horn to the other across the lens will be the axis upon which the said lens is rotatable. Furthermore, it will be observed that the upper or distance lenses are beveled on the lower curved edges, so as to allow them to receive the upper edges of the lower or near-view lenses at the angle to their planes. In this manner the parts of my improved bifocal spectacles are so arranged as to be extremely useful and practical, and a very simple, cheap, and practical article for use in various ways is produced.

Having thus described my invention, I claim as new and desire to secure by Letters Patent—

In bifocal spectacles, the combination of long-focus or distance lenses provided with notches in their lower inner or nasal edges, having their axes approximately parallel, and short-focus or near-view lenses arranged within the said notches at an angle to the plane of the long-focus lenses, with their axes convergent to a point in the plane of normal vision, the said near-view lenses being placed with one horn of the lens at the lower temporal edge and the other horn at the middle nasal edge of the spectacles, so that a line drawn from one horn to the other across the lens will be the axis upon which the said lens is rotatable, the said upper or distance lenses being beveled on the lower curved edges, so as to allow them to receive the upper edges of the lower or near-view lenses at the aforesaid angle to their planes, all substantially as described.

GODFREY HESS CLINE.

Witnesses:
A. F. MARTIN,
JENNIE M. MARTIN.